H. YEAGER.
CAR WHEEL JOURNAL.
APPLICATION FILED MAY 20, 1918.
1,299,528.
Patented Apr. 8, 1919.
3 SHEETS—SHEET 2.
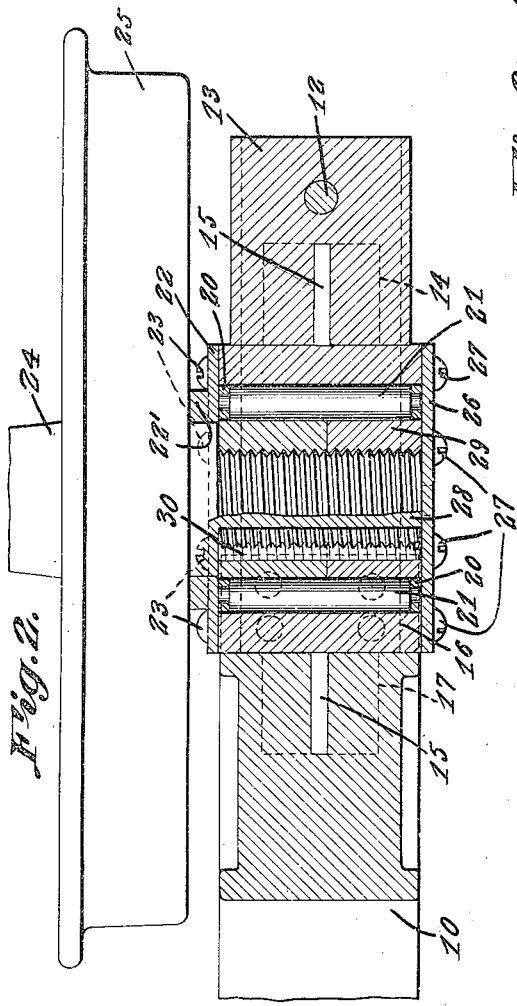
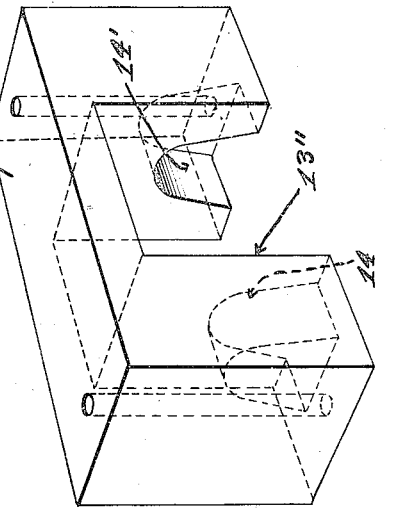
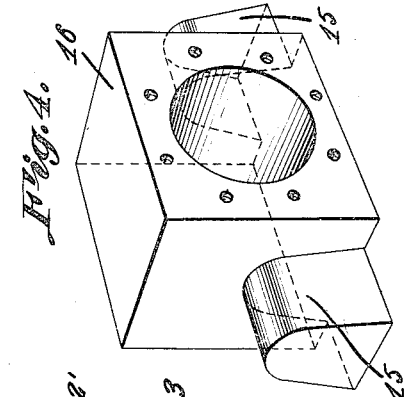
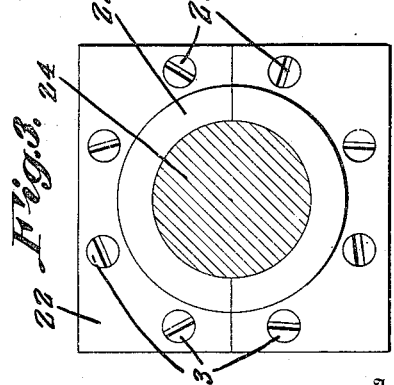
Inventor
H. Yeager,
By C. A. Snow & Co.
Attorneys
Witness

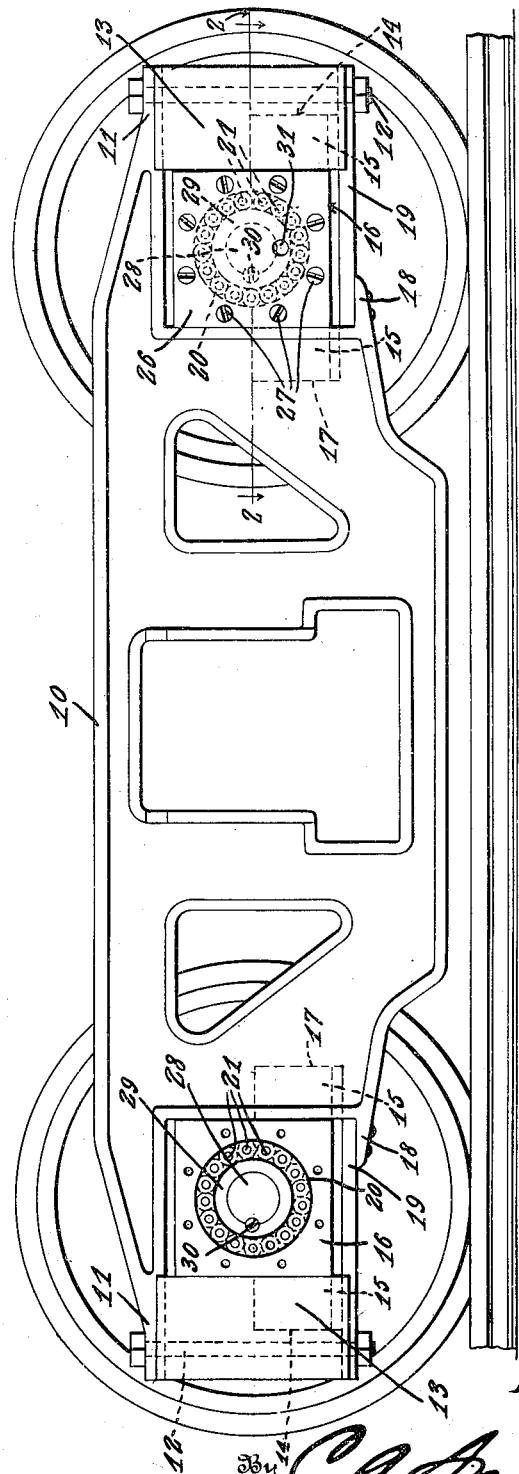

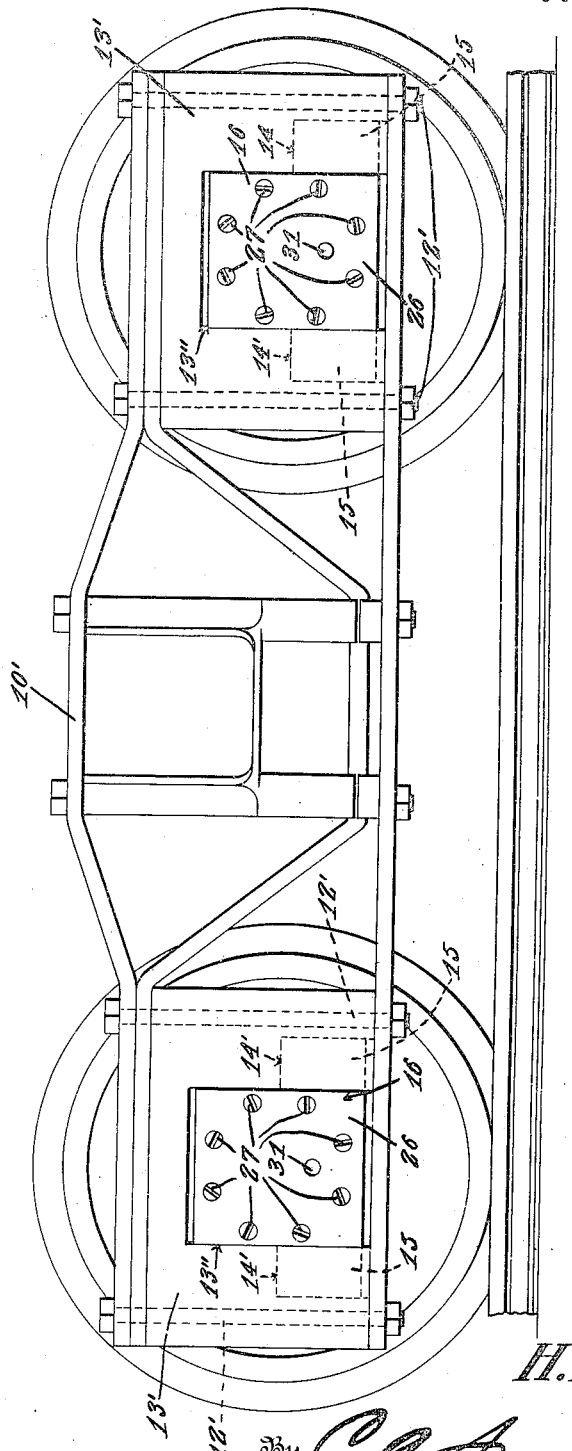

UNITED STATES PATENT OFFICE.

HAYDEN YEAGER, OF CINCINNATI, IOWA.

CAR-WHEEL JOURNAL.

1,299,528.  Specification of Letters Patent.  Patented Apr. 8, 1919.

Application filed May 20, 1918. Serial No. 235,714.

*To all whom it may concern:*

Be it known that I, HAYDEN YEAGER, a citizen of the United States, residing at Cincinnati, in the county of Appanoose and State of Iowa, have invented a new and useful Car-Wheel Journal, of which the following is a specification.

The subject of this invention is a car wheel journal adapted principally for use on railway cars, though susceptible of use on other cars, if desired.

A main object of the invention is the provision of roller bearings for car wheel journals.

The invention also contemplates the provision of means for connecting the journaling block to its support which will compensate for wear and maintain a firm connection at all times.

A further object of the invention is the provision of means for supporting the journaling block.

A still further object of the invention is to generally improve the construction and enhance the utility of car wheel journals.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Practical embodiments of the invention are shown in the accompanying drawings, wherein:—

Figure 1 is a view in side elevation of the side frame of a car truck with journals constructed in accordance with the invention in place therein;

Fig. 2 is a section taken on the line 2—2 of Fig. 1;

Fig. 3 is a view in elevation of the rear retaining plate the axle shown in section;

Fig. 4 is a perspective view of the journaling block;

Fig. 5 is a view in elevation of a modified form of the invention adapted for attachment to an arch bar truck and shown applied to a truck;

Fig. 6 is a perspective view of the modified form of supporting block.

Referring to the drawings by numerals of reference:—

A cast steel side frame of a car truck is indicated by the numeral 10, and this frame is formed with overhanging ends 11 which are apertured to receive bolts 12. The bolts 12 depend from the overhanging ends and pass through bores formed in blocks 13, and have nuts threaded on their ends for the purpose of binding the blocks firmly to the frame. These blocks are formed with recesses 14 which open at the lower faces of the blocks and the opposed side walls of which converge upwardly. The recesses 14 are provided to receive lugs 15 which extend from journaling blocks 16 and which lugs are formed to agree with the contour of the recesses.

The ends of the side frames 10 have recesses 17 formed therein for the reception of the lugs 15 which extend from the opposite faces of the journaling blocks 16, and underlying these recesses are supporting members 18 which extend longitudinally from the lower corners of the ends of the frame 10. Retaining plates 19 have their inner ends resting upon the members 18, to which they are secured by rivets or otherwise, while their outer ends are apertured to receive the bolts 12 by which they are bound in place to firmly support the journaling blocks 16.

The journaling block 16 is centrally apertured to receive a cage 20 in which are journaled the spaced rollers 21. The cage is held in place within the block 16 by means of a retaining plate 22, which is preferably divided to permit of its easy adjustment in place, and which is formed with a central hub 22' which forms a spacing sleeve between the journaling block and the car wheel. The plate 22 is secured to the rear face of the journaling block by means of screws 23 or otherwise. A plate 26 is also provided for retaining the cage 20 in place within the block 16, and this plate is secured to the front or outer face of the block by means of screws 27 or otherwise, and this plate may be provided with an aperture 31 through which lubricant may be supplied to the rollers and journal.

The car wheel 25 is rigid on its shaft 24 and the end or journal of the shaft, indicated by the numeral 28, is reduced and threaded to receive the sleeve 29 which is threaded thereon, and which sleeve is preferably divided into two longitudinal sections. This sleeve is locked in place upon the journal 28 by a screw key 30. As will be seen from a consideration of Fig. 2, the sleeve 29 forms the wearing surface of the journal and rests against the rollers 21. It is also to be noted that the inner end of the sleeve 29 is overlapped by the retaining plate 22 sc that the journal is held firmly in place within the block 16.

In the modified form shown in Figs. 5 and 6 an arch bar truck frame is shown and indicated by the numeral 10′, and the ends of the upper bar of this frame are apertured to receive the depending bolts 12′ which pass through apertures formed in a retaining block 13′, and through apertures in the lower bar of the frame, and are bound in place by means of nuts which are threaded on their threaded ends.

The block 13′ is formed with a recess or slot 13″ which opens at its lower face, and is provided for the reception of the journaling block 16. Recesses 14′ communicate with and extend from opposed sides of the recess 13″, and open at the lower face of the block 13′, in which they are formed, and these recesses serve to receive the lugs 15 of the journaling block 16.

The journaling block in this modified form is the same as that heretofore described, having the cage 20 with its rollers 21 retained in its aperture by the plates 22 and 26.

The sleeve 29, being easily detached, forms a ready means for renewing the journal when worn, and the formation of the lugs 15 and the recesses 14 and 14′ insure a steady support for the journaling block at all times.

Having thus described the invention, what is claimed as new and sought by Letters Patent, is:—

1. A car wheel journal, comprising a frame provided with a main recess and supplied with secondary recesses projecting in opposite directions from the main recess and communicating therewith; and a journaling block in the main recess, the journaling block being provided with oppositely projecting lugs, the upper edges of the lugs being spaced from the upper surface of the block, the lugs being received in the secondary recesses, the ends of the block coöperating with the walls of the main recess above the lugs.

2. A car wheel journal comprising a frame including a first block provided in its lower edge with a main recess, and supplied with secondary recesses projecting in opposite directions from the main recess and communicating therewith, the secondary recesses extending but part way through the block; and a journaling block provided with oppositely projecting lugs, the upper edges of the lugs being spaced from the upper surface of the journaling block, the journaling block being received in the main recess of the first block, and the lugs being received in the secondary recesses of the first block.

3. A car wheel journal comprising a block; a cage in the block; anti-friction devices mounted in the cage; a sleeve journaled in the anti-friction devices and located in the cage; a shaft threaded into the sleeve; a car wheel on the shaft; a key engaging the sleeve and the shaft; plates coacting with the ends on the sleeve; and means for securing the plates to the block.

In testimony that I claim the foregoing as my own I have hereto affixed my signature in the presence of two witnesses.

HAYDEN YEAGER.

Witnesses:
ESTON W. SPANGLER,
ORALS D. PATTERSON.